(12) United States Patent
Fell et al.

(10) Patent No.: US 6,883,374 B2
(45) Date of Patent: *Apr. 26, 2005

(54) VIBRATORY GYROSCOPIC RATE SENSOR

(75) Inventors: Christopher P Fell, Plymouth (GB); Rebecka Eley, Plymouth (GB); Colin H. J. Fox, Nottingham (GB); Stewart McWilliam, Nottingham (GB)

(73) Assignee: BAE Systems plc, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 10/475,580

(22) PCT Filed: Sep. 6, 2002

(86) PCT No.: PCT/GB02/04066

§ 371 (c)(1), (2), (4) Date: Oct. 22, 2003

(87) PCT Pub. No.: WO03/025505

PCT Pub. Date: Mar. 27, 2003

(65) Prior Publication Data

US 2004/0144174 A1 Jul. 29, 2004

(30) Foreign Application Priority Data

Sep. 14, 2001 (GB) .............................................. 0122254

(51) Int. Cl.[7] .............................................. G01P 9/04
(52) U.S. Cl. .................................................. 73/504.13
(58) Field of Search .................... 73/504.13, 504.12, 73/504.02

(56) References Cited

U.S. PATENT DOCUMENTS

| | | | |
|---|---|---|---|
| 5,226,321 A | 7/1993 | Varnham et al. | |
| 5,817,940 A | 10/1998 | Kobayashi et al. | |
| 5,915,276 A | 6/1999 | Fell | |
| 5,932,804 A | 8/1999 | Hopkin et al. | |
| 6,089,090 A | 7/2000 | Namerikawa et al. | |
| 6,151,964 A | 11/2000 | Nakajima | |
| 6,272,925 B1 | 8/2001 | Watson | |
| 6,282,958 B1 | 9/2001 | Fell et al. | |
| 6,343,509 B1 | 2/2002 | Fell et al. | |
| 6,401,534 B1 | 6/2002 | Fell et al. | |

FOREIGN PATENT DOCUMENTS

| | | |
|---|---|---|
| EP | 0 836 073 A | 4/1998 |
| EP | 0 859 219 | 8/1998 |
| GB | 2318184 A | 4/1998 |
| GB | 2 322 196 | 8/1998 |
| GB | 2 335 273 | 9/1999 |
| GB | 2338781 A | 12/1999 |
| WO | 99/22203 A | 5/1999 |
| WO | 99/47890 A | 9/1999 |
| WO | 99/47891 | 9/1999 |
| WO | 00/09971 | 2/2000 |
| WO | 01/53776 | 7/2001 |
| WO | 01/55675 | 8/2001 |

*Primary Examiner*—John E. Chapman
(74) *Attorney, Agent, or Firm*—Nixon & Vanderhye P.C.

(57) ABSTRACT

A three axis rate sensor includes a substantially planar vibratory resonator having a substantially ring or hoop-like structure with inner and outer peripheries extending around a common axis, drive means for causing the resonator to vibrate in a Cos 2θ vibration mode, carrier mode pick-off means for sensing movement of the resonator in response to the applied drive z-axis response mode, pick-off means for detecting movement of the resonator in response to rotation about the z-axis, z-axis response mode drive means for nulling said motion, x-axis response mode pick-off mean for detecting movement of the resonator in response to rotation about the x-axis, x-axis response mode drive means for nulling said motion, y-axis response mode pick-off mean for detecting movement of the resonator in response to rotation about the y-axis, y-axis response mode drive means for nulling said motion, and support means for flexibly supporting the resonator and for allowing the resonator to vibrate relative to the support means in response to the drive means and the applied rotation wherein the support means comprises only L support beams, where $L \neq 2^K$, and K=0, 1, 2 or 3. For example there may be three, five, six or seven support beams.

11 Claims, 5 Drawing Sheets

VIBRATORY GYROSCOPIC RATE SENSOR

This application is the U.S. national phase of international application PCT/GB02/04066, filed 6 Sep. 2002, which designated the US. PCT/GB02/04066 claims priority to GB Application No. 0122254.6, filed 14 Sep. 2001. The entire contents of these applications are incorporated herein by reference.

This invention relates to rate sensors for sensing applied rate on three axes.

The use of planar ring shaped resonators in Cariolis rate sensors is well known. GB 2318141 B describes the use of such a resonator to obtain rate sensitivity about three orthogonal axes.

The devices described in GB 2318184 B makes use of a pair of in-plane Sin 2θ/Cos 2θ vibration modes, shown in FIGS. 1A and 1B, in combination with a degenerate pair of out of plane Sin θ/Cos θ (rocking) vibration modes, shown in FIGS. 2A and 2B. The in-plane Cos 2θ mode acts as the primary carrier mode which is typically maintained at a fixed vibration amplitude. When the device is rotated about the axis normal to the plane of the ring (z-axis), Coriolis forces are induced which couple energy into the complementary in-plane Sin 2θ response mode. When the device is rotated about the y-axis in the plane of the ring, Coriolis forces are induced which couple energy in the out of plane Cos θ response mode. When the device is rotated about the x-axis in the plane of the ring, Coriolis forces are induced which couple energy in the out of plane Sin θ response mode. The amplitude of the induced response mode motions is directly proportional to the applied rotation rates about the appropriate input axes.

For this device, the carrier and the three response mode frequencies are required to be nominally identical. With these frequencies accurately matched the amplitude of the response mode vibration is amplified by the mechanical quality factor, Q, of the structure. This inevitably makes the construction tolerances more stringent. In practice, it may be necessary to fine-tune the balance of the vibrating structure or resonator, for instance by adding or removing material at appropriate points. This adjusts the stiffness or mass parameters for the modes and thus differentially shifts the mode frequencies. Where these frequencies are not matched the Q amplification does not occur and the pick-offs must be made sufficiently sensitive to provide adequate gyroscope performance.

For a perfect unsupported ring structure fabricated from radially isotropic material, any given pair of in or out of plane Sin Nθ/Cos Nθ modes will have identical frequencies for any value of N. This degeneracy may be perturbed due to the requirement for the leg structures which support the ring. In the three axis rate sensor design of the prior art, for an appropriate configuration of support legs, the number and spacing of the support legs is such that the symmetry of both the in-plane Cos 2θ/Sin 2θ modes and the out of plane Sin θ/Cos θ modes is maintained. This has hitherto been achieved using eight identical support legs spaced at 45° intervals. FIG. 3 shows such an arrangement. In this arrangement a central boss 20 is formed on a support frame 20. Support legs 9 extend between a central boss 20 and the inner periphery 6 of a resonator 5. It will be noted that the relative lengths of the linear parts 9' and 9" of the support legs are different in FIG. 3, and this is part of the normal design variation that would be understood by a person skilled in the art. Also it will be understood that the provision of a central boss 20 in FIG. 3 is a known alternative to radial external support for the resonator 5. These arrangements are interchangeable, irrespective of the number of support legs being used. The resonator dimensions are set in order to match the frequency of the in-plane Cos 2θ/Sin 2θ mode pair to that of the out of plane Sin θ/Cosθ mode pair.

These leg structures are required to suspend the ring but must also allow it to vibrate in an essentially undamped oscillation for both in and out of plane vibrations. The total stiffness of the legs when subjected to in-plane and out of plane motions must be significantly less than that of the ring itself so that the modal vibration is dominated by the ring structure. In order to achieve the required compliance ratio the legs need to be considerably thinner than the ring rim width. For devices such as these, the radial and tangential stiffness of the legs should be significantly lower than that of the ring itself so that the modal vibration is dominated by the ring structure. The in-plane radial stiffness is largely determined by the length of the arcuate segment 9''' of the leg. The straight segments 9' and 9" dominate the in-plane tangential stiffness. The out of plane stiffness is determined by the total length of the leg structure. Maintaining the ring to leg compliance ratio, particularly for the radial stiffness, for this design of leg becomes increasingly difficult as the arc angle of the leg structure is restricted by the proximity of the adjacent legs. This requirement places onerous restrictions on the mechanical design of the support legs and necessitates the use of leg structures which are thin (in the plane of the ring) in comparison to the ring rim. This reduced dimension renders these structures more susceptible to the effects of dimensional tolerancing in the production processes of the mechanical structure. This will result in variation in the mass and stiffness of these supporting leg elements which will perturb the symmetry of the mode dynamics and hence induce undesirable frequency splitting of both the in and out of plane mode pairs.

WO-A-9947890 discloses a gyroscope for sensing rate on at least two axes using a range of mode combinations including Cos 2θ and Cos θ modes and employing eight or more resonator support legs.

WO-A-9922203 discloses a multi axis gyroscope which may be implemented using a ring shaped vibratory structure using a range of in and out, of plane Cos nθ mode combinations but does not describe any suitable support leg numbers.

The structures described in the prior art may be fabricated in a variety of materials using a number of processes. Where such devices are fabricated from metal these may be conveniently machined to high precision using wire erosion techniques to achieve the accurate dimensional tolerancing required. This process involves sequentially machining away material around the edges of each leg and the ring structure. The machining time, and hence production cost, increases in proportion to the number of legs. Minimising the number of legs is therefore highly beneficial. Similar considerations apply to structures fabricated from other materials using alternative processes.

It would be desirable to be able to design planar ring structures which require a reduced number of support legs but without affecting the vibration of the ring structure to any greater extent from the prior art arrangements having a relatively large number of support legs.

According to a first aspect of the present invention, there is provided a three axis rate sensor including a substantially planar vibratory resonator having a substantially ring or hoop-like structure with inner and outer peripheries extending around a common axis, drive means for causing the resonator to vibrate in a Cos 2θ vibration mode, carrier mode pick-off means for sensing movement of the resonator in response to the applied drive, z-axis response mode pick-off means for detecting movement of the resonator in response to rotation about the z-axis, z-axis response mode drive means for nulling said motion, x-axis response mode pick-off means for detecting movement of the resonator in response to rotation about the x-axis, x-axis response mode drive means for nulling said motion, y-axis response mode pick-off means for detecting movement of the resonator in response to rotation about the y-axis, y-axis response mode drive means for nulling said motion, and support means for flexibly supporting the resonator and for allowing the resonator to vibrate relative to the support means in response to the drive means and to applied rotations characterised in that the support means comprises only L support beams, where $L \neq 2^K$, K=0, 1, 2 or 3, and L<8. For example, there may be three, five, six or seven support beams.

Each support beam may comprise first and second linear portions extending from opposite ends of an arcuate portion.

In the embodiment, the support beams are substantially equi-angularly spaced.

Conveniently, the support means includes a base having a projecting boss, with the inner periphery of the substantially ring or hoop-like structure being coupled to the boss by the support beams which extend from the inner periphery of the ring or hoop-like structure to the projecting boss so that the ring or hoop-like structure is spaced from the base.

In the embodiment, the total stiffness of the support beams is less than that of the ring or hoop-like structure.

The formulae define above have been obtained as a result of detailed analysis of the dynamics of the ring or hoop-like structure including the effects of leg motion. The present invention may provide increased design flexibility allowing greater leg compliance (relative to the ring) whilst employing increased leg dimensions (in the plane of the ring). Such designs may exhibit reduced sensitivity to dimensional tolerancing effects and allow more economical fabrication.

For a better understanding of the present invention, and to show how the same may be carried into effect, reference will now be made, by way of example, to the accompanying drawings, in which:

FIG. 4 shows in plan a sensor for sensing applied rate on three axes. This sensor is described by way of example only, and it should be understood that other arrangements could be used in accordance with the present invention.

Figure 1A:
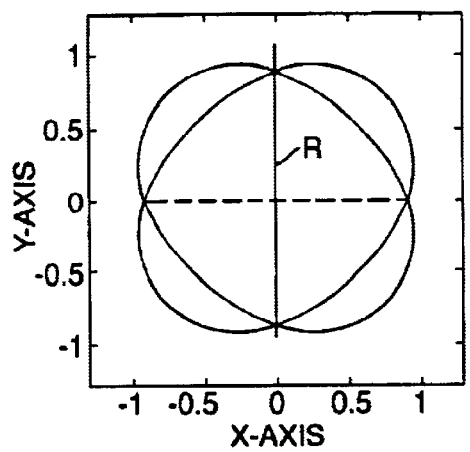
FIGS. 1A and 1B show diagrammatically a pair of in-plane Sin 2θ/Cos 2θ vibration modes in a symmetric resonator or vibrating structure.

The vibrating structure 5 has a substantially planar substantially ring-like shape having an outer rim 7, legs 9 and a central boss 20 as previously described. The structure 5 is located via the boss 20 on an insulating substrate layer 21 which may be made of glass or silicon with an insulating oxide surface layer. The vibrating structure 5 is maintained at a fixed voltage with respect to all the conductors which act as the drive and pick-off elements.

Figure 4:
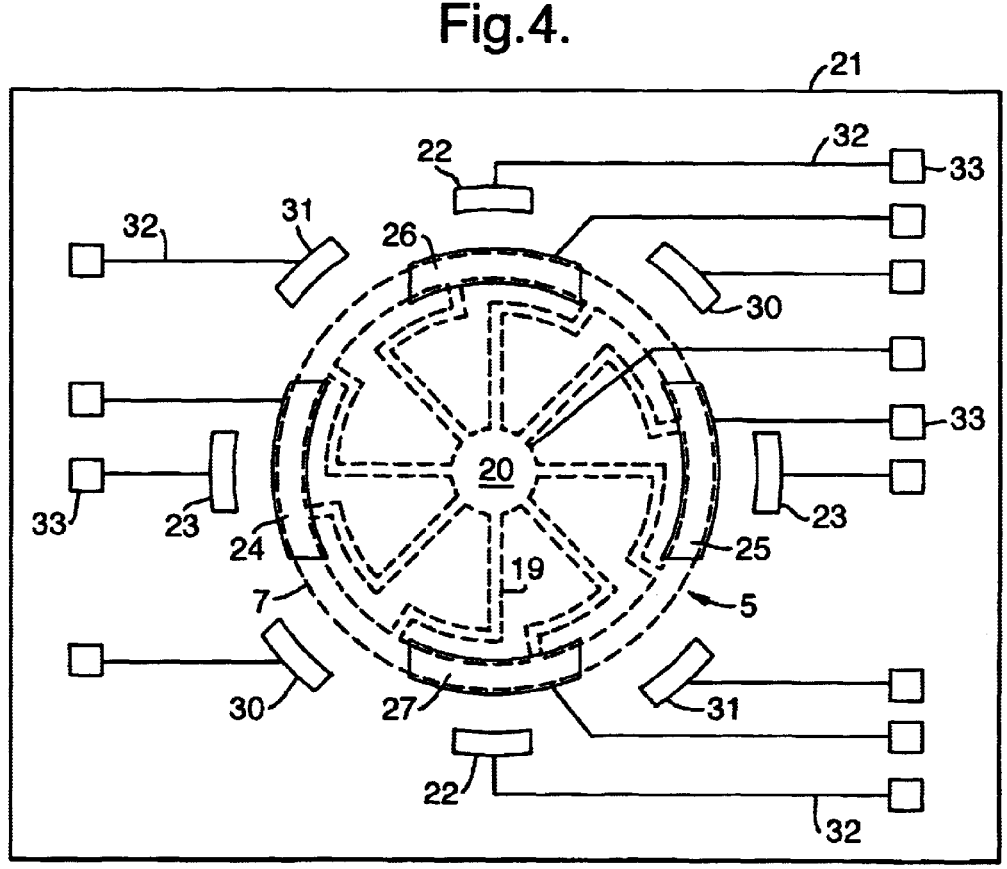
FIG. 4 shows in plan view a three axes rate sensor according to the present invention.

In FIG. 4 means for vibrating the silicon vibrating structure 5 in a Cos 2θ carrier mode includes two electrostatic carrier drive elements 22 and two electrostatic carrier mode pick-off elements 23 arranged with the drive elements 22 at 0° and 180° and the pick-off elements 23 at 90° and 270° respectively with respect to the outer rim 7 of the vibrating structure 5 and located radially externally of the outer rim 7 adjacent the points of maximum radial motion of the rim 7 when vibrating in the Cos 2θ mode. These carrier mode drive elements 22 are used to set the vibrating structure 5 into oscillation. The carrier mode pick-off elements 23 which are located at the carrier mode anti-nodal points, sense the radial motion of the vibrating structure 5.

The drive elements may be electromagnetic, electrostatic, piezo, thermal or optical in actuation and the vibrating structure 5 motion may be detected using electrostatic, electromagnetic, piezo or optical techniques.

The means for detecting the rocking mode vibration includes an x-axis electrostatic drive element 24, an x-axis electrostatic pick-off element 25, a y-axis electrostatic drive element 26 and a y-axis electrostatic pick-off element 27 located adjacent the outer rim 7 in the superimposed relationship therewith at a perpendicular spacing therefrom with the y-axis drive element 26, the x-axis element 25, the y-axis pick-off element 27 and the x-axis drive element 24 being arranged at 0°, 90°, 180° and 270° respectively around the outer rim 7.

The means for vibrating the vibrating structure 5 additionally includes two electrostatic z-axis response mode drive elements 30 and two electrostatic z-axis response mode pick-off elements 31 located in the plane of the outer rim 7 of the vibrating structure 5 radially externally thereof adjacent points of maximum radial movement for the outer rim 7 when vibrating in a response mode. The first z-axis response mode drive element 30, the first z-axis response mode pick-off element 31, and second z-axis response mode drive element 30 and the second z-axis response mode pick-off element 31 are arranged at 45°, 135°, 225° and 315° respectively around the outer rim 7 of the vibrating structure 5.

Figure 5:
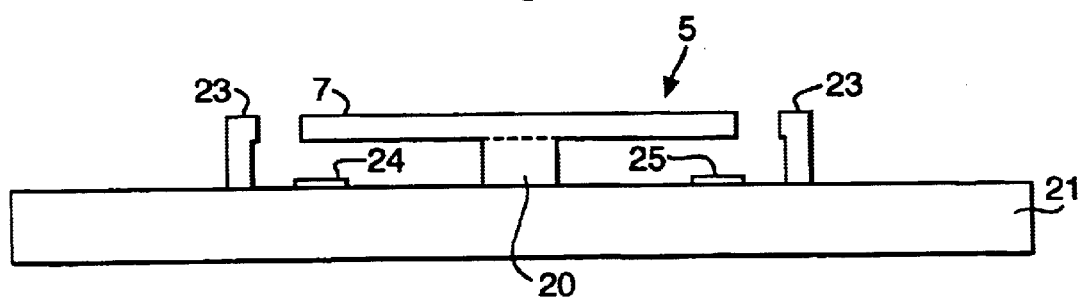
FIG. 5 is an edge view of a detail of the structure of FIG. 4.

The rocking motion of the x-axis rate response mode is detected at the pick-off element 25 located on the surface of the support substrate under the rim 7. This motion is nulled using the x-axis drive element 24 similarly located under the opposite side of the rim 7. The y-axis rate response motion is similarly detected by pick-off element 27 and nulled by drive element 26. The various drive and pick-off conductive sites are connected, via tracking 32 laid onto the substrate layer surface 21, to bond pads 33. The drive and pick-off circuitry is then connected to these bond pads. The z-axis rate response mode motion is detected by the pick-off elements 31. A cross-section of the sensor of FIG. 4 is shown in FIG. 5. This shows the topography of the in-plane and surface conductors more clearly.

Figure 1B:
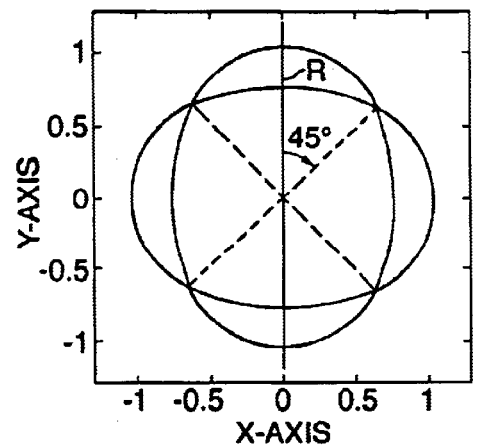
Figure 2A:
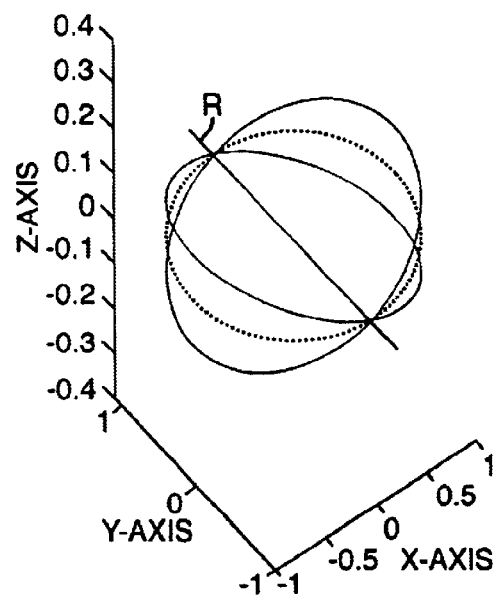
FIGS. 2A and 2B show diagrammatically a degenerate pair of out of plane Cos 2θ/Sin 2θ (rocking) vibration modes in a symmetric resonator or vibrating structure acting as a response mode.
Figure 2B:
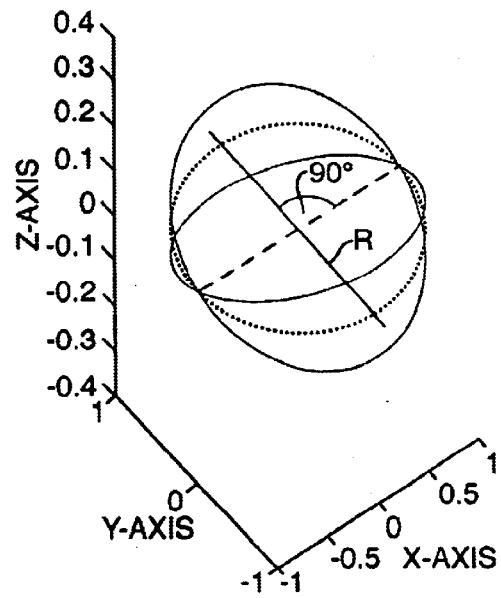
Figure 3:
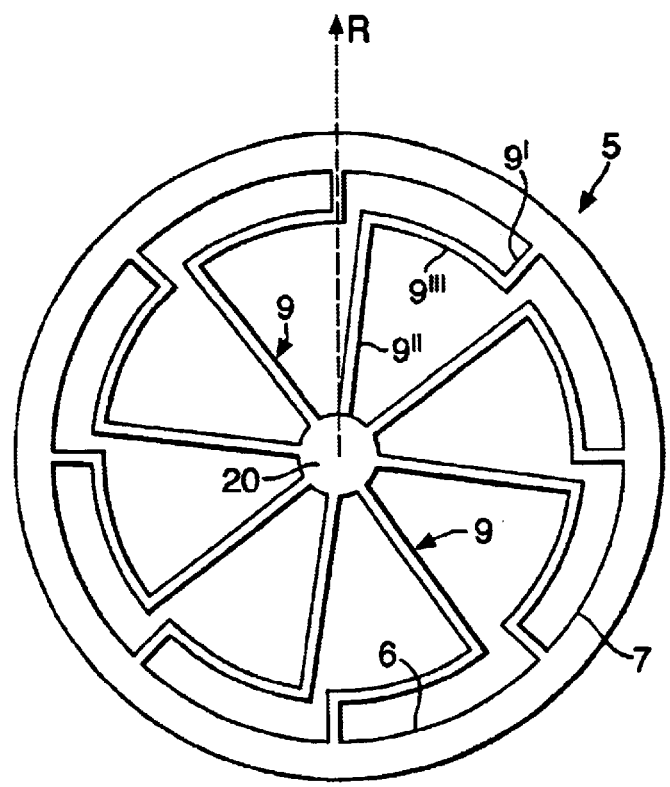
FIG. 3 shows a plan view of a conventional vibrating structure or resonator, suitable for use in a 3 axis rate sensor according to the present invention.

For a three axis gyroscope, a pair of in-plane Cos 2θ/Sin 2θ vibration modes, as shown in FIGS. 1A and 1B, is used in combination with a degenerate pair of out of plane Sinθ/Cosθ (rocking) vibration modes, as shown in FIGS. 2A and 2B. The in-plane Cos 2θ mode acts as the primary carrier mode which is typically maintained at a fixed vibration amplitude. When the device is rotated about the axis normal to the plane of the ring (z-axis), Coriolis forces are induced which couple energy into the complementary in-plane Sin 2θ response mode. When the device is rotated about the y-axis in the plane of the ring, Coriolis forces are induced which couple energy in to the out of plane Cos θ response mode. When the device is rotated about the x-axis in the plane of the ring, Coriolis forces are induced which couple energy in to the out of plane Sin θ response mode. The amplitude of the induced response mode motions is directly proportional to the applied rotation rates about the appropriate input axes.

A detailed analysis of the dynamics of the ring including the effects of the leg motion has enabled simple formulae to be developed which prescribe the range of options available in terms of the number of substantially evenly spaced support legs required to maintain frequency matching of the desired vibration mode pairs.

The analysis indicates that the requirement on the number of legs is far less restrictive than previously indicated. Simple formulae have been derived indicating which modes will have their frequency split for a given number of evenly spaced support legs. These formulae are applicable to both in-plane and out of plane modes and are valid for L>2. If L≦2 then all modes will be split. For an even number of legs, L, frequency splitting for a mode of order N will only occur when the following condition is met:

$$N = \frac{LK}{2}$$

where K is an integer. Maximum frequency splitting occurs when K=1 and reduces as K is increased. If the number of legs, L, is odd then frequency splitting will only occur where:

$$N=LK$$

The maximum splitting again occurs for K=1 and decreases as the value of K increases.

Figure 6A:
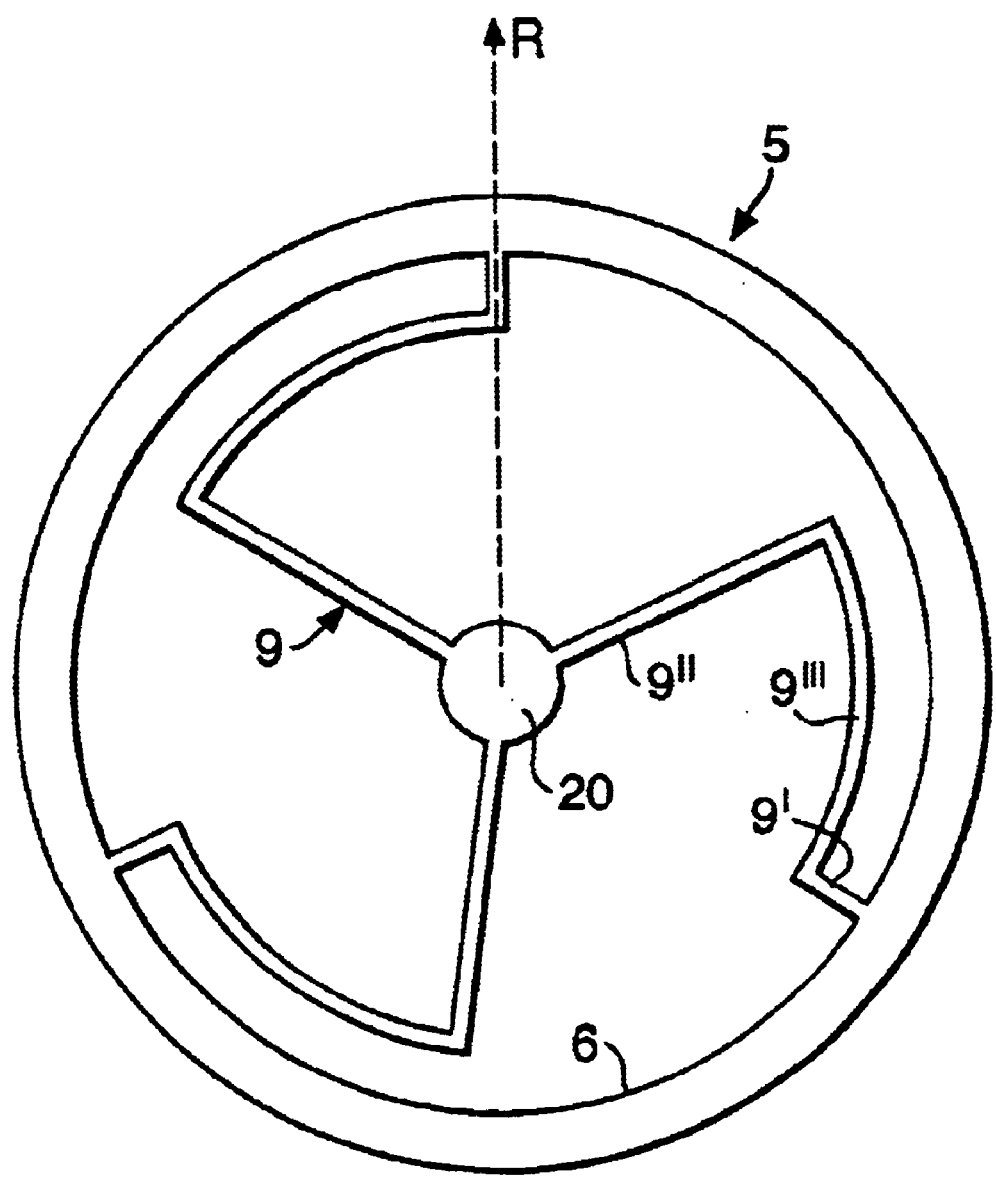
FIGS. 6A, 6B and 6C are plan views of a vibrating structure suitable for use in a three axis gyroscope having three, five and six support legs, respectively.
Figure 6B:
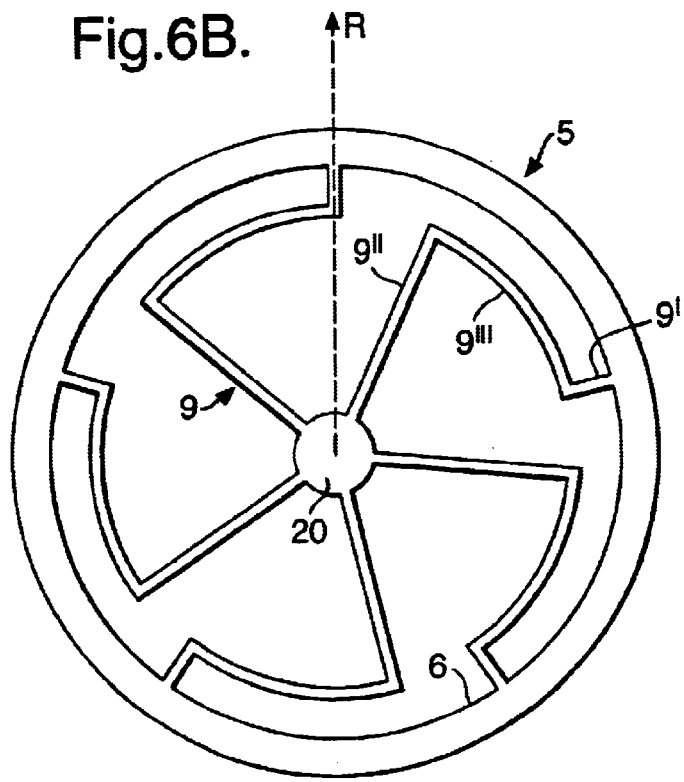
Figure 6C:
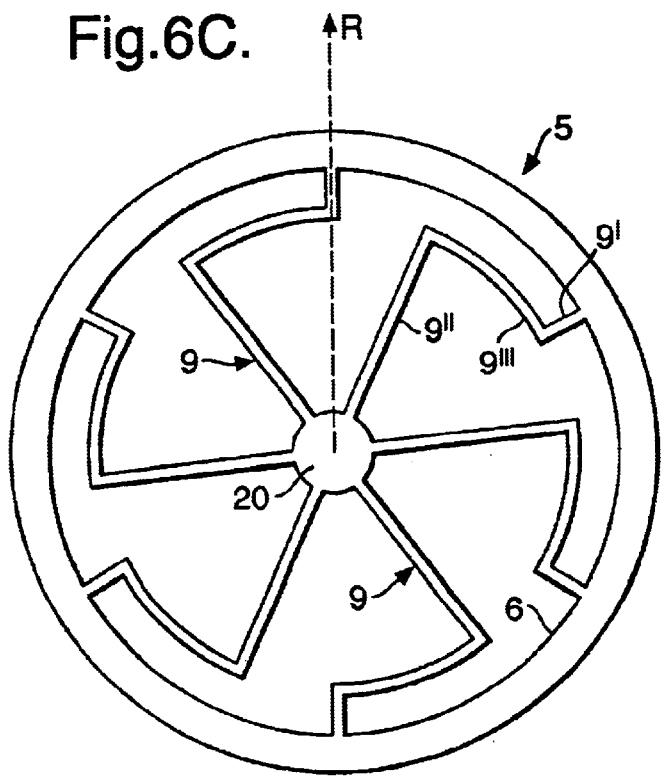

Applying these general principles to the prior art three axis design indicates that the number of support legs is not restricted to eight. Planar resonator structures conforming to the following formula for the number of support legs may be constructed:

$$L \neq N^K$$

where N is the mode order (=2 for Cos 2θ modes) and K is an integer of value 0, 1, 2 or 3. The legs should be equi-angularly spaced. Support structures consisting of three legs at 120° spacing, five legs at 72° spacing, six legs at 60° spacing, seven legs at 51.4° spacing, etc., such as shown in FIGS. 6A, 6B and 6C, which preserve the required mode frequency matching between the in-plane Cos 2θ/Sin 2θ modes and the out of plane Cos θ/Sin θ modes, may be utilised. Although providing eight or more legs may preserve more frequency matching, providing more than seven legs is disadvantageous for the reasons discussed above.

In all resonator designs the combined stiffness of the support legs is required to be less than that of the ring. This ensures that the modal vibration is dominated by the ring structure and helps to isolate the resonator from the effects of thermally induced stresses coupling in via the hub 20 of the structure, which will adversely affect performance. When employing fewer support legs the required leg to ring compliance ratio may be maintained by using longer support leg structures of increased width. This renders these structures less suceptible to the effects of dimensional tolerancing errors arising during the fabrication process. Such errors induce frequency splitting between the Cos 2θ/Sin 2θ and Cos θ/Sin θ mode pairs which are detrimental to the sensor performance. These typically necessitate the use of mechanical trimming procedures to achieve the desired performance levels. Reducing the requirement for this trimming procedure is therefore highly desirable in terms of cost and fabrication time.

What is claimed is:

1. A three axis rate sensor including a substantially planar vibratory resonator having a substantially ring or hoop-like structure with inner and outer peripheries extending around a common axis, drive means for causing the resonator to vibrate in a Cos 2θ vibration mode, carrier mode pick-off means for sensing movement of the resonator in response to the applied drive means, z-axis response mode pick-off means for detecting movement of the resonator in response to rotation about the z-axis, z-axis response mode drive means for nulling said motion, x-axis response mode pick-off means for detecting movement of the resonator in response to rotation about the x-axis, x-axis response mode drive means for nulling said motion, y-axis response mode pick-off means for detecting movement of the resonator in response to rotation about the y-axis, y-axis response mode drive means for nulling said motion, and support means for flexibly supporting the resonator and for allowing the resonator to vibrate relative to the support means in response to the drive means and to applied rotation, characterised in that the support means comprises only L support beams, where L≠$2^K$, K=0, 1, 2 or 3, and L<8.

2. A rate sensor according to claim 1, wherein each support beam comprises first and second linear portions extending from opposite ends of an arcuate portion.

3. A rate sensor according to claim 2, wherein the support beams are substantially equi-angularly spaced.

4. A rate sensor according to claim 2, wherein the support means includes a base having a projecting boss with the inner periphery of the substantially ring or hoop-like structure being coupled to the boss by the support beams which extend from said inner periphery of the ring or hoop-like structure to the projecting boss so that the ring or hoop-like structure is spaced from the base.

5. A rate sensor according to claim 2 wherein the total stiffness of the support beams is less than that of the ring or hoop-like structure.

6. A rate sensor according to claim 1, wherein the support beams are substantially equi-angularly spaced.

7. A rate sensor according to claim 6, wherein the support means includes a base having a projecting boss with the inner periphery of the substantially ring or hoop-like structure being coupled to the boss by the support beams which extend from said inner periphery of the ring or hoop-like structure to the projecting boss so that the ring or hoop-like structure is spaced from the base.

8. A rate sensor according to claim 6 wherein the total stiffness of the support beams is less than that of the ring or hoop-like structure.

9. A rate sensor according to claim 1, wherein the support means includes a base having a projecting boss with the inner periphery of the substantially ring or hoop-like structure being coupled to the boss by the support beams which extend from said inner periphery of the ring or hoop-like structure to the projecting boss so that the ring or hoop-like structure is spaced from the base.

10. A rate sensor according to claim 9 wherein the total stiffness of the support beams is less than that of the ring or hoop-like structure.

11. A rate sensor according to claim 1 wherein the total stiffness of the support beams is less than that of the ring or hoop-like structure.

* * * * *